United States Patent [19]

Cooper

[11] 3,945,486

[45] Mar. 23, 1976

[54] CONTAINER SUPPORTING AND TRANSPORTING DEVICE

[75] Inventor: Darryl B. Cooper, Indianapolis, Ind.

[73] Assignee: Glass Containers Corporation, Fullerton, Calif.

[22] Filed: Oct. 15, 1974

[21] Appl. No.: 514,392

[52] U.S. Cl. .............. 198/179; 198/131; 214/1 BA; 294/63 A; 294/93; 294/99 R
[51] Int. Cl.² ........................................ B65G 15/00
[58] Field of Search ............... 198/131, 177 R, 179; 214/1 BA; 294/63 A, 93, 99, 86.15

[56] References Cited
UNITED STATES PATENTS

| 751,253 | 2/1904 | Brady | 294/63 A |
|---|---|---|---|
| 1,795,322 | 3/1931 | Triplett | 294/86.15 |
| 2,901,013 | 8/1959 | Freeman | 294/93 |
| 3,741,409 | 6/1973 | Pointer | 294/93 |
| 3,780,492 | 12/1973 | Corderoy | 294/93 |

Primary Examiner—John J. Love
Assistant Examiner—Douglas D. Watts
Attorney, Agent, or Firm—Parmelee, Miller, Welsh & Kratz

[57] ABSTRACT

Apparatus is disclosed for releasably supporting and transporting rigid open-mouthed containers by engaging the interior surface of the container mouth with an inflatable elongated elastomeric diaphragm, means being provided for inflating and deflating the diaphragm. The apparatus is particularly useful in suspending and conveying heated glass bottles through various processing stages wherein various coatings are applied to the outer surfaces of the bottles.

8 Claims, 11 Drawing Figures

3,945,486

CONTAINER SUPPORTING AND TRANSPORTING DEVICE

BACKGROUND OF THE INVENTION

Containers and, in particular, open-mouth rigid containers, such as glass bottles or the like, are commonly subjected to post treatment wherein various coatings are applied to the outer surfaces of the container. Such coatings are applied, for example, to improve fracture resistance, impart lubricous properties and, in some cases, to color the containers. The coatings are applied by conventional techniques, such as dipping or by electrostatic deposition, and cured by heat treatment.

The containers are generally carried through the coating and curing stages on hangers suspended from a continuous conveyor, the containers being releasably engageable with the hanger. Furthermore, it is preferable that the containers be supported interiorly by the hanger, one such means of providing internal support for the container being disclosed in U.S. Pat. No. 3,777,875, assigned to the assignee of the present invention.

In the said patent, the hanger member terminates in a frusto-conical resilient member which is forcibly inserted into the container mouth and frictionally engages the inner surface thereof whereby the container may be carried through the various processing stages. The container is released by forcibly disengaging the resilient insert by the downward stroke of a cylindrical sleeve-like member actuated by a cam means.

This container transporting means suffers, however, from the disadvantage that the resilient frusto-conical member must be sized to engage a container mouth of a particular diameter, with the consequence that the resilient members must be changed to accommodate containers having only slightly differing mouth dimensions. Moreover, the forcible engagement and disengagement of the resilient member results in increased wear and frequent replacement of the resilient member. Additionally, the containers must be accurately aligned with their respective hangers in order to assure proper engagement of the resilient member with the container mouth.

SUMMARY OF THE INVENTION

According to the invention a hollow, elongated elastomeric diaphragm, carried on the lower end of the hanger member, is inserted into the mouth of the container. A double-acting hydraulic cylinder integral with the hanger member is energized to impart stored energy through a fluid medium to expand the diaphragm, the expanded diaphragm frictionally engaging the interior surface of the container mouth. The container is disengaged by relieving the static pressure, which deflates the diaphragm. The hydraulic system is energized, i.e., the diaphragm is inflated, at all times other than when the container is picked up and removed, at which times the system is de-energized, i.e., the diaphragm is deflated.

DESCRIPTION OF THE DRAWINGS

The invention is illustrated in a preferred embodiment by the following drawings, wherein.

DESCRIPTION OF THE INVENTION

Figure 1:
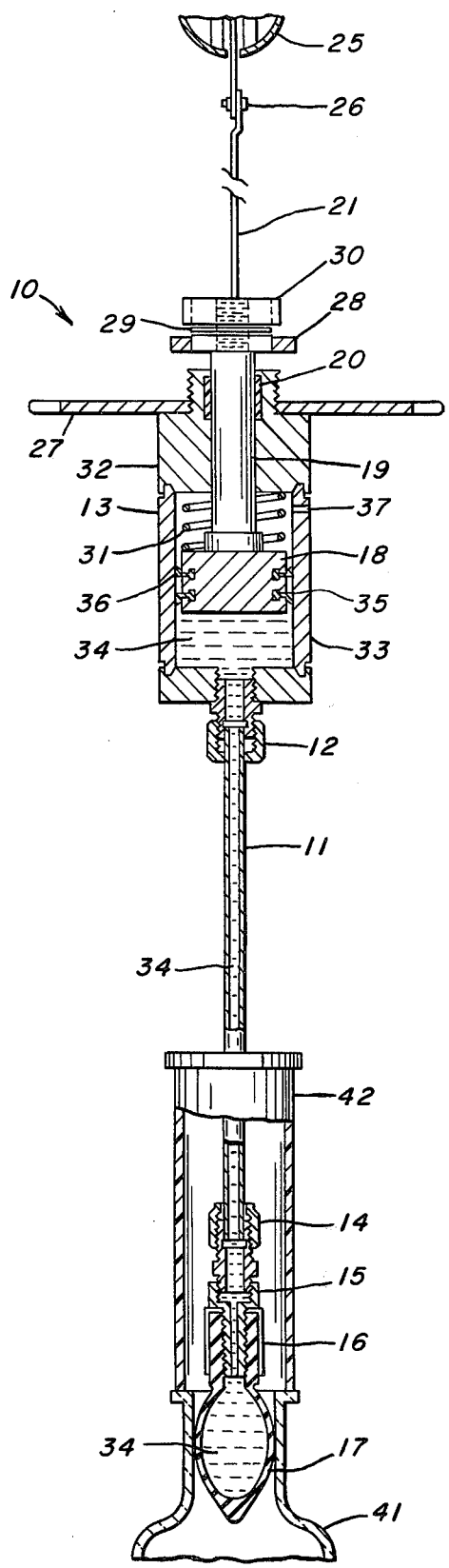
FIG. 1 is an elevation view, partly in section, of the container transporting device in an energized condition.

With reference to FIG. 1, the container supporting and transporting device of the invention is depicted at 10 in its energized condition. The device 10 is in the energized condition at all times, except when it is engaging a container or when it is disengaging from a container. The device 10 comprises a linearly extending hollow rod or tube 11 which is connected at its upper end via a fitting 12 to the lower end of a cylinder 13 and is adapted at its lower end to be connected with a hollow, elongated elastomeric diaphragm 17 via fittings 14 and 15 and ferrule 16. The tube 11 is fabricated of any structurally suitable material, preferably steel or stainless steel. The diaphragm 17 is formed from a compression molded elastomeric material, for example, a silicone rubber or the like capable of withstanding continuous operating temperatures of about 425°F without deformation or loss of elastic memory. A silicone rubber marketed under the tradename "Blensil" by General Electric Company has proved to be satisfactory. A cylindrical sleeve 42 slidably mounted on tube 11 may also be provided. The sleeve 42 serves the purpose of protecting the lower section of the tube, fittings and diaphragm from contact with the particular coating or pigment being applied to the container, the lower end of the sleeve bearing on the top surface of the container. The sleeve is preferably fabricated on a non-conductive, chemically resistant material, such as "Teflon" or the like.

A piston 18 is disposed within cylinder 13, the cylinder 13 being movable with respect to the piston 18, as will be explained hereinafter. A piston rod 19 is secured to the piston 18, the rod extending through the upper end of the cylinder 13 which is provided with a seal 20. The upper end of the piston rod 19 is connected to a bracket 21, the bracket 21 being rigidly affixed to a conveyor means 25 such as, for example, a monorail conveyor, via fastening means 26, such as a nut and bolt as shown. It is thus seen that the piston 18, piston rod 19 and bracket 21 form a linear fixed assembly depending from the conveyor means 25 and is also fixed with respect to vertical movement of cylinder 13.

A sprocket 27 is fixedly mounted on the upper end of cylinder 13 and coaxial therewith. Low-friction rotation of the assembly is assured by the provision of bearing means 28 mounted about the upper threaded end of piston rod 19, the bearing means 28 being secured by a lock washer 29 and a nut 30. The sprocket 27 also serves as a bearing or pressure plate to de-energize the device as will be described hereinafter.

A spring 31 is disposed within the upper portion 32 of cylinder 13 and is expanded against the fixed piston 18 and cylinder 13. As the spring is used to store energy, it is preferred that it have a capacity of at least twelve times the container weight at maximum operating temperature. The lower portion 33 of cylinder 13 serves as a fluid reservoir. The fluid 34 is a non-compressible thermally stable liquid which is compatible with all parts of the device with which it is contacted. The fluid 34 completely fills the reservoir 33, tube 11 and diaphragm 17. To eliminate loss of fluid due to leakage between the cylinder wall and the piston, resulting in a loss of working pressure, the piston is provided with an annular fluid seal 35. To prevent air from becoming entrapped on the working side of the cylinder, the piston is provided with a second annular seal 36. The fluid seal 35 must be of a material that is capable of withstanding operating temperatures, i.e., about 425°F, and be compatible with the hydraulic fluid, whereas the air seal 36, which is not in contact with the hydraulic fluid, must only be capable of withstanding operating temperatures. A material such as "Viton" has been found to be suitable for both the fluid and air seals. A vent hole 37 is provided in the upper portion 32 of cylinder 13 to provide for relieving back pressure on piston 18, as well as to provide access for lubricating the spring 31.

It is important that the fluid side of the device contain no compressible fluid, e.g., air or other gases, as even partial fluid compressibility will use the energy required by the diaphragm to maintain a friction coefficient sufficient to carry the container. As the degree of freedom in the diaphragm must be as low as possible to maintain desirable temperature elasticity and longevity characteristics, the relatively high degree of freedom resultant from air pockets would use a substantial portion of the energy necessary to inflate the diaphragm to the required extent. Moreover, as air is not thermally stable, heating at processing temperatures could cause overexpansion of the diaphragm were air entrapped on the fluid side. Additionally, entrapped air would require an unrealistically high amount of cylinder displacement.

It is, of course, to be understood that the term "non-compressible", as applied to the fluid contemplated, is used as a matter of practical convenience as all liquids are to some extent compressible. However, the compressibility is so small as to be negligble in most applications and liquids are thus said to be practically non-compressible. For example, a pressure of one p.s.i. will compress a given volume of water only about one part in 300,000.

As beforementioned, FIG. 1 is illustrative of the device in its energized condition. In this state, the compression spring 31 is expanded against the piston 18, thus statically loading the fluid 34 in reservoir 33, which load is transmitted through the fluid in tube 11, thereby expanding the resilient walls of the elastomeric diaphragm 17 to frictionally engage the inner surface of the mouth of a container 41.

The term "static load" as used herein can be analogized to a static load as applied to an axial bar wherein a load that is just touching the end of the bar is suddenly released such that the velocity of approach is zero. The load is constant throughout the entire deformation and the internal force in the bar increases from zero to some value SA wherein S is the unit stress, i.e., the amount of force per unit area of surface, and A is the cross-sectional area of the bar to which the load is applied. In the instant case, however, a fluid rather than a solid material is static loaded.

Figure 2:
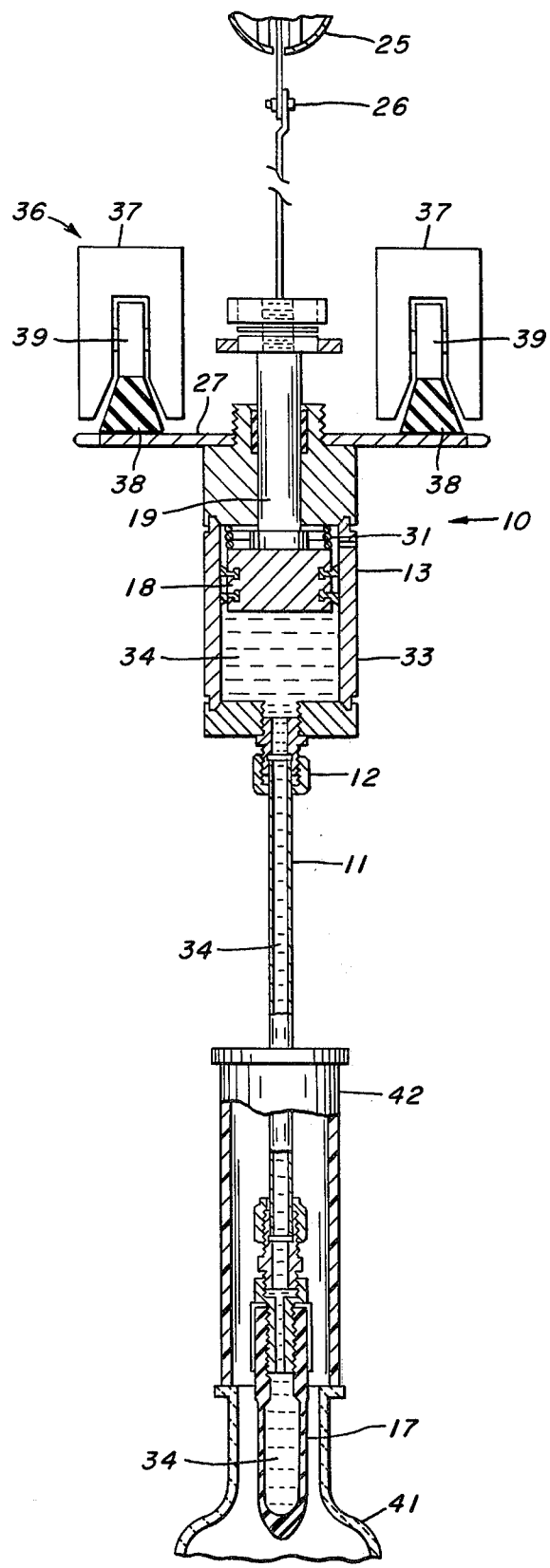
FIG. 2 is an elevation view, partly in section, of the container transporting device in a de-energized condition.

FIG. 2 is illustrative of the means by which the device is de-energized, whereby the diaphragm 17 is deflated to permit insertion into or withdrawal of the same from a container. At the points of pick-up and take-off of the container, the assembly 10 travels under a cam means 36. A preferred type of cam means comprises a pair of overhead rails 37, and associated V-belts 38, the belts being backed by bearings 39 supported in the rails 37. The cam belts 38 bear on either side of the top surface of the sprocket or pressure plate 27, depressing the same which results in vertical downward displacement of cylinder 13 with respect to the fixed piston 18 and rod 19. Downward displacement of cylinder 13 results in compression of spring 31 and enlargement of the volume of fluid reservoir 33, thus relieving the static load on the fluid 34 in the reservoir 33, tube 11, and diaphragm 17, the diaphragm deflating and returning to its fabricated dimensions, thus permitting frictionless insertion into or removal from the container 41. Disengagement of the cam means 36 results in expansion of spring 31, which causes the assembly 10 to return to its energized state as shown in FIG. 1.

It is preferred that the volume displacement capacity on the fluid side should be a minimum of 10% greater than the volume displacement of the diaphragm and a maximum of 40% greater. The minimum excess displacement will permit the cylinder to compensate for diaphragm elasticity and assembly tolerance error whereas the maximum excess displacement will limit fluid contamination in the event of rupture or mechanical failure of the diaphragm.

Figure 5F:
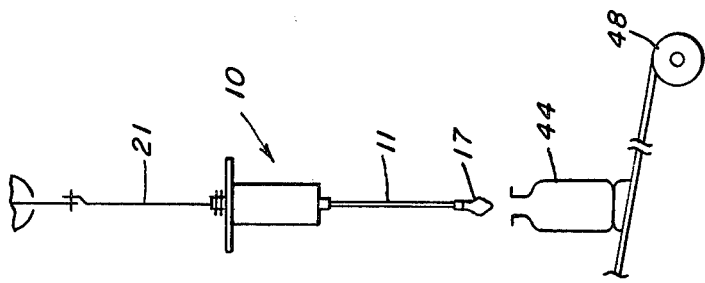
FIGS. 5a to 5f represent schematically the sequence of operation of the container transporting device of the invention.
Figure 5E:
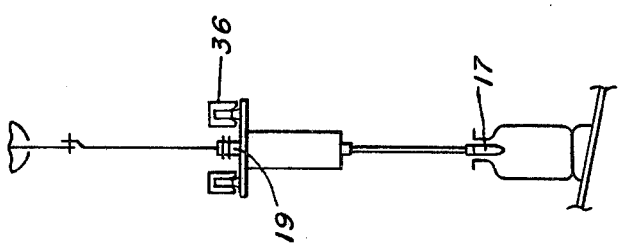
Figure 5D:
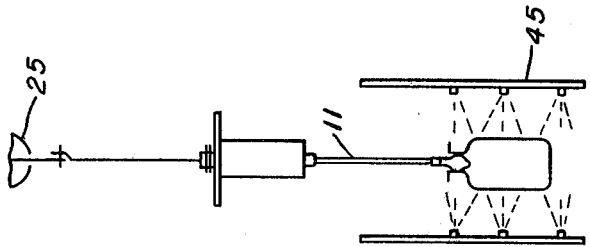
Figure 5C:
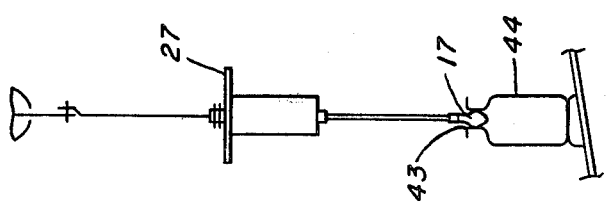
Figure 5B:
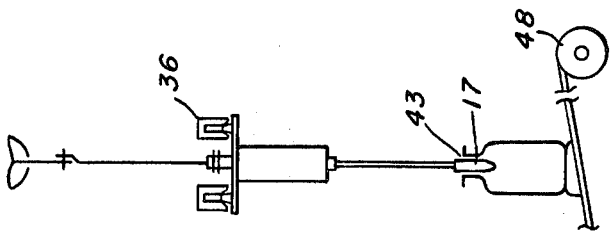
Figure 5A:
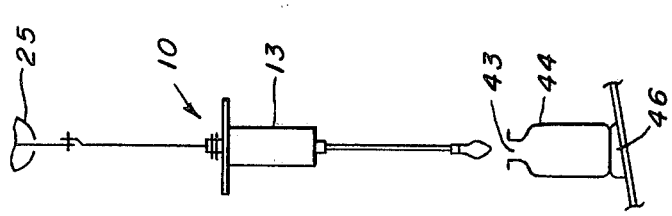

FIGS. 5a to 5f are illustrative of the mode of operation of the container supporting and transporting device of the invention. A container 44 having an open mouth portion 43 is advanced via a conveyor pallet 46 to a position where the mouth 43 is approximately aligned with energized assembly 10, (FIG. 5a). The container shown is a typical glass bottle, but it is apparent that a variety of other rigid containers of different design may be used, as the diaphragm dimensions may be varied to accommodate any open-mouthed container. Concurrently with the alignment of the container 44 with assembly 10, the cam means 36 de-energizes the assembly in the manner described with reference to FIG. 2 and the deflated diaphragm 17 is inserted into the bottle mouth 43. While insertion of the diaphragm into the bottle mouth can be effected by relative downward movement of the assembly with respect to the bottle, it is desirable to effect insertion by moving the container upward relative to the assembly via an inclined conveyor 48 as depicted, (FIG. 5b). As the cam disengages, the assembly is energized, causing inflation of the diaphragm 17 which frictionally engages the inner surface of the mouth portion 43, (FIG. 5c). The suspended container is then conveyed through the various processing stages, such as the electrostatic coating stage 45 depicted in FIG. 5d. At the completion of processing, the assembly is de-energized by engagement with another cam means 36. The diaphragm 17 is again deflated and withdrawn from the container, (FIG. 5d). Disengagement of the cam means returns the assembly 10 to its energized condition, (FIG. 5f).

Although FIG. 5 illustrates the use of a pallet to maintain the container in vertical axial alignment with the transporting device at the points of pick-up and take-off, the use of a pallet is optional as it has been found that, due to the resilient member, the container may be inclined as much as 12° to the vertical axis of the transporting device without affecting the ability of the device to satisfactorily engage with or disengage from the container.

Figure 3:
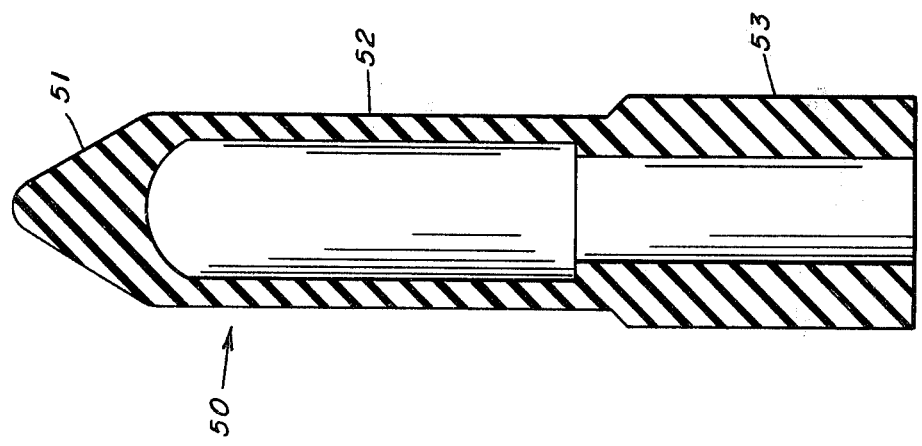
FIG. 3 is an expanded sectional view of an elastomeric diaphragm usable in the present invention.

FIG. 3 is illustrative of a preferred configuration of the elastomeric diaphragm of the invention in its fabricated state. The diaphragm 50, molded from a silicone rubber elastomer or the like, although of unitary construction, can best be described as consisting of three parts, namely, a tip portion 51, a body portion 52 and a rear portion 53. The tip portion 51 is of solid construction and is of a generally conical configuration. The body portion 52 is configured as a hollow cylinder. The rear portion 53 is also in the form of a hollow cylinder with an outside diameter slightly greater than the outside diameter of the body portion 52. As shown in FIGS. 1 and 2, the rear portion 53 is in engagement with the tube 11 via fittings 14 and 15 and is secured thereto by ferrule 16. Consequently, as the rear portion 53 is in adaptive engagement with the tube 11 and the tip portion 51 is of solid construction, only the body portion 52 will be expanded substantially radially outwardly along its axial length by the application of the static hydraulic load when the device is energized as described hereinabove.

In order to assure dynamically stable pick-up and removal of the container by the diaphragm, the same is preferably dimensioned such that for a given overall length, the tip portion 51 comprises from 15 to 20% of the length, the body portion 52 comprises from 45 to 60% of the length, and the rear portion comprises from about 30 to 35% of the length. The inside diameter of the body portion 52 is preferably from 60 to 80% of its outside diameter, the inside diameter of the rear portion 53 being from 80 to 90% of the inside diameter of the body portion 52 and the outside diameter of the rear portion 53 being from 120 to 130% of the outside diameter of the body portion 52.

For example, in order to engage a container mouth having an inside diameter of from 0.625 to 0.700 inch (1.59 to 1.78 cm), an elastomeric diaphragm of substantially the following dimension is recommended:

| | | |
|---|---|---|
| Length, overall: | 3.00 inches | (7.62 cm) |
| Length, tip portion: | 0.50 inch | (1.27 cm) |
| Length, body portion: | 1.50 inches | (3.81 cm) |
| Length, rear portion: | 1.00 inch | (2.54 cm) |
| O. D., body portion: | 0.60 inch | (1.52 cm) |
| I. D., body portion: | 0.42 inch | (1.07 cm) |
| O. D., rear porotion: | 0.72 inch | (1.83 cm) |
| I. D., rear portion: | 0.375 inch | (0.95 cm) |

It has been common practice to apply coatings or the like to containers by electrostatic means. Generally speaking, an electrostatic coating system includes a spray generator from which the coating composition emanates in the form of very finely divided particles. The particles are passed near a high voltage probe or electrode whereby an electrostatic charge is induced on the particles. In order to assure deposition of a uniform adherent coating to the container, it is preferable to provide a means of maintaining a potential difference between the spray particles and the container, one such means being illustrated in FIGS. 4 and 4a.

Figure 4A:
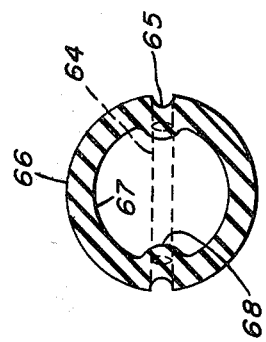
FIG. 4a is a cross-sectional view of FIG. 4 taken along the line A—A.
Figure 4:
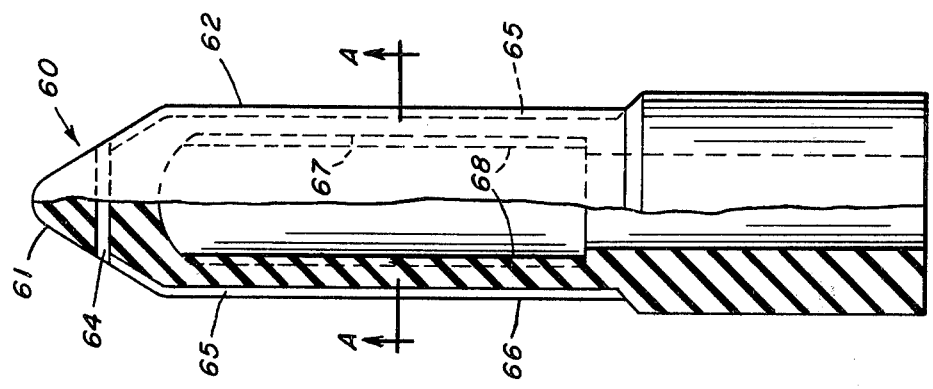
FIG. 4 is an expanded view, partly in section, of the elastomeric diaphragm of FIG. 3 modified for electrostatic spraying operations.

FIGS. 4 and 4a depict a diaphragm 60 similar to the diaphragm shown in FIG. 3, the diaphragm 60 being adapted and modified to assure maintenance of the requisite potential difference between the charged spray particles and the container in the following manner.

A small radially extending hole 64 is provided in the tip portion 61 of diaphragm 60 the hole 64 being bored completely through the tip portion and communicating with vertically extending channels 65 formed in the outer wall 66 of body portion 62. Extending inwardly from the inner wall 67 of body portion 62 and corresponding to channels 65 are ribs 68. A length of small diameter, e.g., about 24-gauge, conductive wire, preferably copper wire (not shown), is threaded through hole 64 and recessed in channels 65, the wire being held in place by ferrule 16 (FIGS. 1 and 2). As the wire is completely recessed in the channels 65, when the diaphragm is in its fabricated or de-energized conditions, the wire will not abrade the container upon insertion of the diaphragm into the container mouth. When the diaphragm is energized, i.e., expanded, the wire expands with the diaphragm wall and contacts the inner surface of the container mouth, thus providing an electrically conductive path to maintain the requisite potential difference to assure uniform deposition of the coating.

Although the invention, in its preferred embodiments, has been described in considerable detail in the foregoing disclosure, it is to be understood that such description is only illustrative of the invention and that many variations will be apparent therein to those skilled in the art without departing from the spirit and scope thereof.

What is claimed is:

1. An apparatus for releasably suspending and transporting open-mouth rigid containers comprising:
   A. overhead conveyor means having a container pick-up point and a container take-off point;
   B. an assembly depending from said conveyor means, said assembly engaging a container at said pick-up point, disengaging the container at said take-off point and transporting the container along the conveyor between the pick-up and take-off points, said assembly comprising:
   a. a hollow support rod having an upper end and a lower end;
   b. a hollow, elongated resilient diaphragm affixed to and in open communication with the lower end of said support rod; and
   c. hydraulic means cooperative with the upper end of said support rod whereby said diaphragm is deflated at said points of pick-up and take-off to permit respective insertion into and removal of said diaphragm from the container mouth and whereby said diaphragm is inflated to frictionally engage the inner surface of the container mouth during transport between said pick-up and take-off points, said hydraulic means comprising:
   i. a cylinder having an upper end and a lower end;
   ii. a piston disposed in said cylinder and coaxial therewith, the piston dividing the cylinder into an upper annular portion and a lower annular portion, the upper end of said support rod being affixed to and in open communication with said lower annular portion of said cylinder, said cylinder being vertically displaceable with respect to said piston;
   iii. a non-compressible fluid contained in said lower annular portion of said cylinder, said hollow support rod and said resilient diaphragm;

d. means for transferring a static load through said fluid whereby the diaphragm is inflated and means for relieving said static load whereby the diaphragm is deflated, said means for transferring and relieving said static load comprising a coil spring disposed in said upper annular portion of said cylinder and coaxial therewith, said spring being expanded when said cylinder is displaced vertically upward relative to the piston thereby transferring said static load, said spring being compressed when said cylinder is displaced vertically downwardly relative to the piston thereby relieving said static load; and e. means at said points of pick-up and take-off to displace said cylinder vertically downward with respect to said piston.

2. The apparatus of claim 1 including sealing means to prevent the fluid from entering the upper annular portion of the cylinder.

3. The apparatus of claim 2 wherein said sealing means comprises an annular ring of resilient material disposed about the periphery of the piston.

4. The apparatus of claim 1 wherein said cylinder displacement means comprises:

a) a bearing plate affixed at the upper end of said cylinder; and b) cam means located at the pick-up and take-off points, said assembly being conveyed under said cam means, whereby said cam means bears downwardly on said bearing plate resulting in downward displacement of said cylinder with respect to said piston.

5. The apparatus of claim 4 wherein said cam means comprises a pair of spaced V-belts which bear downwardly on either side of said bearing plate as said assembly passes under said cam means at the points of pick-up and take-off.

6. The apparatus of claim 1 wherein the diaphragm is formed of a rubber-like elastomer.

7. The apparatus of claim 1 wherein the diaphragm is expanded outwardly substantially along its axial length.

8. The apparatus of claim 1 wherein a plurality of said assemblies depend from said conveyor means at fixed intervals along the length thereof, each of said assemblies releasably engaging and transporting a respective container.

* * * * *